US010728367B2

(12) United States Patent
Kitamura et al.

(10) Patent No.: US 10,728,367 B2
(45) Date of Patent: Jul. 28, 2020

(54) CONTROL SYSTEM, CONTROL DEVICE, CONVERSION DEVICE, METHOD FOR CONTROLLING CONTROL SYSTEM, METHOD FOR CONTROLLING CONTROL DEVICE, AND METHOD FOR CONTROLLING CONVERSION DEVICE

(71) Applicant: MURATA MACHINERY, LTD., Kyoto-shi, Kyoto (JP)

(72) Inventors: Wataru Kitamura, Inuyama (JP); Kentaro Kataoka, Kyoto (JP)

(73) Assignee: MURATA MACHINERY, LTD., Kyoto (JP)

(*) Notice: Subject to any disclaimer, the term of this patent is extended or adjusted under 35 U.S.C. 154(b) by 50 days.

(21) Appl. No.: 16/145,329

(22) Filed: Sep. 28, 2018

(65) Prior Publication Data
US 2019/0132426 A1    May 2, 2019

(30) Foreign Application Priority Data

Oct. 31, 2017  (JP) .................................. 2017-210392

(51) Int. Cl.
| | |
|---|---|
| G06F 15/16 | (2006.01) |
| H04L 29/06 | (2006.01) |
| G05B 19/418 | (2006.01) |
| G06F 13/42 | (2006.01) |
| H04L 29/08 | (2006.01) |

(Continued)

(52) U.S. Cl.
CPC .......... *H04L 69/08* (2013.01); *G05B 19/4185* (2013.01); *G06F 13/42* (2013.01);
(Continued)

(58) Field of Classification Search
CPC ..... H04L 1/0002; H04L 47/263; H04L 69/18; H04L 69/08; H04L 67/12; H04L 67/025;
(Continued)

(56) References Cited

U.S. PATENT DOCUMENTS

2003/0165150 A1* 9/2003 Zimmermann ... H04L 29/06027
370/412
2005/0015165 A1  1/2005 Naya et al.
(Continued)

FOREIGN PATENT DOCUMENTS

| JP | 06-276206 A | 9/1994 |
|---|---|---|
| JP | 10-70547 A | 3/1998 |

(Continued)

OTHER PUBLICATIONS

Ikegami, D. et al.; "Performance of the Rate Control on Correlation Coefficient of Network Delay in Various Topologies"; Proceedings of the 2004 Institute of Electronics, Information and Communication Engineers (IEICE) General Conference: Mar. 22-25, 2004; 9 pages.

(Continued)

*Primary Examiner* — Liang Che A Wang
*Assistant Examiner* — Johnny B Aguiar
(74) *Attorney, Agent, or Firm* — Keating & Bennett, LLP

(57) ABSTRACT

A control system includes a to-be-controlled apparatus disposed in a clean room, a control device disposed outside the clean room and controlling the to-be-controlled apparatus through Ethernet communication, and a conversion device disposed in the clean room and mutually converting communication data on Ethernet communication with the control device and communication data on serial communication with the to-be-controlled apparatus.

7 Claims, 11 Drawing Sheets

(51) Int. Cl.
*H04L 12/835* (2013.01)
*H04L 12/26* (2006.01)
*H04L 12/825* (2013.01)
*H04L 12/70* (2013.01)

(52) U.S. Cl.
CPC .............. *H04L 43/16* (2013.01); *H04L 47/25* (2013.01); *H04L 47/30* (2013.01); *H04L 67/025* (2013.01); *H04L 67/125* (2013.01); *H04L 69/18* (2013.01); *G05B 2219/31145* (2013.01); *H04L 67/12* (2013.01); *H04L 2012/5682* (2013.01)

(58) Field of Classification Search
CPC ....... H04L 67/125; H04L 47/25; H04L 47/30; H04L 47/266; H04L 65/4092; H04L 2012/5682; H04L 43/16; G06F 13/42; G05B 19/4185; G05B 2219/31145
USPC ................ 709/208, 213, 223, 224, 230, 246
See application file for complete search history.

(56) References Cited

U.S. PATENT DOCUMENTS

| | | | | |
|---|---|---|---|---|
| 2005/0021830 | A1* | 1/2005 | Urzaiz | H04L 47/10 709/234 |
| 2006/0212175 | A1* | 9/2006 | Kim | H04L 12/282 700/277 |
| 2006/0265099 | A1* | 11/2006 | Naya | G06F 30/00 700/121 |
| 2008/0084895 | A1* | 4/2008 | Lee | G05B 19/4185 370/466 |
| 2014/0198658 | A1 | 7/2014 | Ajima et al. | |
| 2017/0269147 | A1* | 9/2017 | Rezgui | G06F 11/263 |
| 2017/0366309 | A1* | 12/2017 | Kobayashi | H04L 1/24 |

FOREIGN PATENT DOCUMENTS

| | | |
|---|---|---|
| JP | 11-145050 A | 5/1999 |
| JP | 2000-063143 A | 2/2000 |
| JP | 2003-258828 A | 9/2003 |
| JP | 2007-115237 A | 5/2007 |
| JP | 2007-142782 A | 6/2007 |
| JP | 2011-22974 A | 2/2011 |
| JP | 2012-175333 A | 9/2012 |
| JP | 2016-206059 A | 12/2016 |
| WO | 2013/042219 A1 | 3/2013 |
| WO | 2016/129075 A1 | 8/2016 |

OTHER PUBLICATIONS

Okuda, N. et al.; "The Newest Web Supervision and Control System which Adopted Java"; Fuji Electric Journal; vol. 77; No. 3, May 2004; 14 pages.

* cited by examiner

CONTROL SYSTEM, CONTROL DEVICE, CONVERSION DEVICE, METHOD FOR CONTROLLING CONTROL SYSTEM, METHOD FOR CONTROLLING CONTROL DEVICE, AND METHOD FOR CONTROLLING CONVERSION DEVICE

CROSS REFERENCE TO RELATED APPLICATIONS

This application claims the benefit of priority to Japanese Patent Application No. 2017-210392 filed on Oct. 31, 2017. The entire contents of this application are hereby incorporated herein by reference.

BACKGROUND OF THE INVENTION

1. Field of the Invention

The present invention relates to a control system, a control device, a conversion device, a method to control a control system, a method to control a control device, and a method to control a conversion device.

2. Description of the Related Art

In a facility such as a factory, a transfer system is used in which a carrier traveling on a ceiling, a floor, or the like between a plurality of processing devices delivers and receives articles. Such a carrier receives control information from a control device of the transfer system and travels and operates in accordance with the control information thus received. The transfer system is installed in, for example, a clean room and is used in a process of manufacturing semiconductors as articles.

Existing carriers have been in operation in factories for more than ten years and still use serial communication such as legacy device interfaces (Recommended Standard 232 version C (RS-232C)) to receive control information. A transmission distance of serial communication conforming to RS-232C that is one of the communication standards of these legacy device interfaces is restricted to a range from several meters to a few dozen meters. Therefore, when a transfer system is disposed in a clean room, a control device that controls a carrier via serial communication is also disposed in the clean room at present.

Japanese Unexamined Patent Application Publication 2011-22974 discloses a technique for shortening a waiting time from generation of a transfer command to allocation of the transfer command in a carrier system that controls a carrier traveling in a clean room.

The larger a volume of the clean room is, the more facilities are required to maintain cleanliness, which increases demands for suppressing a maintenance cost of the clean room. There are also demands for disposing, outside the clean room, a computer defining and functioning as a control device that is not directly involved in manufacture or transfer of articles, a desk on which the computer is placed, a chair where a person operating the computer sits, and the like.

SUMMARY OF THE INVENTION

According to preferred embodiments of the present invention, a maintenance cost of a clean room is reduced.

A control system according to a preferred embodiment of the present invention is a control system that causes a control device included in a transfer system to control a conversion device and a to-be-controlled apparatus, the conversion device being controlled via Ethernet communication with the control device, the to-be-controlled apparatus being controlled via serial communication with the conversion device. The to-be-controlled apparatus is disposed in a clean room. The control device is disposed outside the clean room and controls the to-be-controlled apparatus through Ethernet communication. The conversion device is disposed in the clean room and mutually converts communication data on Ethernet communication with the control device and communication data on serial communication with the to-be-controlled apparatus.

Accordingly, in the control system, the conversion device is disposed in the clean room, which eliminates the restriction that a computer defining and functioning as the control device needs to be disposed in the clean room and allows the control device to be disposed outside the clean room. When a space occupied by the conversion device is smaller than that of the control device, a space occupied by the devices of the control system and furniture on which the devices are disposed in the clean room is able to be reduced, which leads to savings in the space occupied by the devices in the clean room. As a result, a maintenance cost of the clean room is able to be reduced.

Further, the control system may include a plurality of the conversion devices that perform serial communication with a plurality of the to-be-controlled apparatuses on a one-to-one basis. The control device may include one Ethernet interface and a plurality of controllers configured or programmed to perform Ethernet communication with the plurality of conversion devices on a one-to-one basis via the one Ethernet interface.

According to this configuration, in the control system the control device is able to transmit control data to the plurality of to-be-controlled apparatuses via the plurality of conversion devices using the one Ethernet interface. With the control system, a number of the control devices is able to be reduced as compared with a configuration where the number of control devices is equal to a number of the to-be-controlled apparatuses. Further, a number of interfaces which the control device includes is able to be reduced as compared with a configuration where the control device includes a number of Ethernet interfaces or legacy device interfaces (for example, serial communication interfaces) equal to the number of the to-be-controlled apparatuses.

Further, the conversion device may include a buffer that temporarily holds the control data received from the control device until the control data is transmitted to the to-be-controlled apparatus. The control device may be configured or programmed to include an estimator that estimates consumption of the buffer, a generator that generates control data to control the to-be-controlled apparatus and transmit the control data which is generated, and a first limiter that determines a maximum transmission rate of the control data based on the consumption estimated by the estimator and limit a transmission data rate of the control data to be transmitted by the generator to a rate equal to or less than the maximum transmission rate which is determined.

According to this configuration, in the control system, the consumption of the buffer of the conversion device in the control system is estimated and then the transmission data rate of the control data to be transmitted by the control device is limited in accordance with the estimation. As a result, the control data is able to be delivered to the to-be-controlled apparatus with the buffer of the conversion device prevented from overflowing or becoming empty.

Further, the conversion device may include a buffer that temporarily holds the control data received from the control device until the control data is transmitted to the to-be-controlled apparatus, an acquirer that acquires consumption of the buffer, and a transmitter that transmits first information indicating that the consumption acquired by the acquirer is greater than a first threshold to the control device. The control device may include a generator that generates the control data to control the to-be-controlled apparatus and transmit the control data which is generated, and a second limiter that sets a maximum transmission rate of the control data to a value greater than a transmission speed of serial communication between the conversion device and the to-be-controlled apparatus. The second limiter may also change the maximum transmission rate to zero upon receiving the first information from the transmitter.

Accordingly, when a probability that the buffer will overflow based on the consumption of the buffer of the conversion device increases, the transmission data rate of the control data to be transmitted by the control device is reduced even in response to a command from the conversion device, which makes it possible to further reduce the probability that the buffer will overflow based on respective determinations made by both the devices.

The transmitter may also transmit, to the control device, second information indicating that the consumption acquired by the acquirer is less than a second threshold after transmitting the first information. The second limiter may also change the maximum transmission rate to a value greater than the transmission speed of serial communication between the conversion device and the to-be-controlled apparatus upon receiving the second information from the transmitter with the maximum transmission rate set to zero.

Accordingly, when a probability that the buffer will become empty based on the consumption of the buffer of the conversion device increases, the transmission data rate of the control data to be transmitted by the control device is increased, which makes it possible to reduce the probability that the buffer will become empty.

Further, a control device according to a preferred embodiment of the present invention controls a to-be-controlled apparatus via conversion between Ethernet communication and serial communication performed by a conversion device. The conversion device includes a buffer that temporarily holds control data received from the control device until the control data is transmitted to the to-be-controlled apparatus. The control device includes an estimator that estimates consumption of the buffer, a generator that generates the control data to control the to-be-controlled apparatus and transmits the control data which is generated, and a limiter that determines a maximum transmission rate of the control data based on the consumption estimated by the estimator and regulates a transmission data rate of the control data to be transmitted by the generator to a rate equal to or less than the maximum transmission rate which is determined.

Accordingly, the same advantageous effects as the control system described above are obtained.

Further, a conversion device according to a preferred embodiment of the present invention is a conversion device that mutually converts Ethernet communication performed by a control device and serial communication performed by a to-be-controlled apparatus. The conversion device includes a buffer that temporarily holds control data received from the control device until the control data is transmitted to the to-be-controlled apparatus, and a transmitter that transmits, to the control device, first information indicating that consumption of the buffer is greater than a first threshold to change a maximum transmission rate of the control data to be transmitted by the control device to zero.

Accordingly, the same advantageous effects as the control system described above are obtained.

Further, a method to control a control system according to a preferred embodiment of the present invention controls a control system that causes a control device included in a transfer system to control a conversion device and a to-be-controlled apparatus, the conversion device being controlled via Ethernet communication with the control device, the to-be-controlled apparatus being controlled via serial communication with the conversion device. The method to control the control system includes a control step of causing the control device disposed outside a clean room to control the to-be-controlled apparatus disposed in the clean room through Ethernet communication, and a conversion step of causing a conversion device disposed in the clean room to mutually convert communication data on Ethernet communication with the control device and communication data on serial communication with the to-be-controlled apparatus.

Accordingly, the same advantageous effects as the control system described above are obtained.

Further, a method to control a control device according to a preferred embodiment of the present invention controls a control device that controls a to-be-controlled apparatus via conversion between Ethernet communication and serial communication performed by a conversion device. The conversion device includes a buffer that temporarily holds control data received from the control device until the control data is transmitted to the to-be-controlled apparatus. The method to control the control device includes an estimation step of estimating consumption of the buffer, a generation step of generating the control data to control the to-be-controlled apparatus and transmitting the control data which is generated, and a limitation step of determining a maximum transmission rate of the control data based on the consumption estimated in the estimation step and regulating a transmission data rate of the control data to be transmitted in the generation step to the maximum transmission rate which is determined.

Accordingly, the same advantageous effects as the control system described above are obtained.

Further, a method to control a conversion device according to a preferred embodiment of the present invention controls a conversion device that mutually converts Ethernet communication performed by a control device and serial communication performed by a to-be-controlled apparatus. The method to control the conversion device includes an acquisition step of acquiring consumption of a buffer that temporarily holds control data received from the control device until the control data is transmitted to the to-be-controlled apparatus, and a transmission step of transmitting, to the control device, first information indicating that the consumption is greater than a first threshold to change a maximum transmission rate of the control data to be transmitted by the control device to zero.

Accordingly, the same advantageous effects as the control system described above are obtained.

Note that preferred embodiments of the present invention can be embodied not only as a device but also as a method in which processors of the device serve as steps, as a program that causes a computer to execute the steps, as a computer readable recording medium such as a CD-ROM in which the program is stored, or as information, data, or signals corresponding to the program. The program, information, data, and signals may be distributed over a communication network such as the Internet.

According to the control systems of preferred embodiments of the present invention, the maintenance cost of the clean room is able to be reduced.

The above and other elements, features, steps, characteristics and advantages of the present invention will become more apparent from the following detailed description of the preferred embodiment with reference to the attached drawings.

DETAILED DESCRIPTION OF THE PREFERRED EMBODIMENTS

Figure 1:
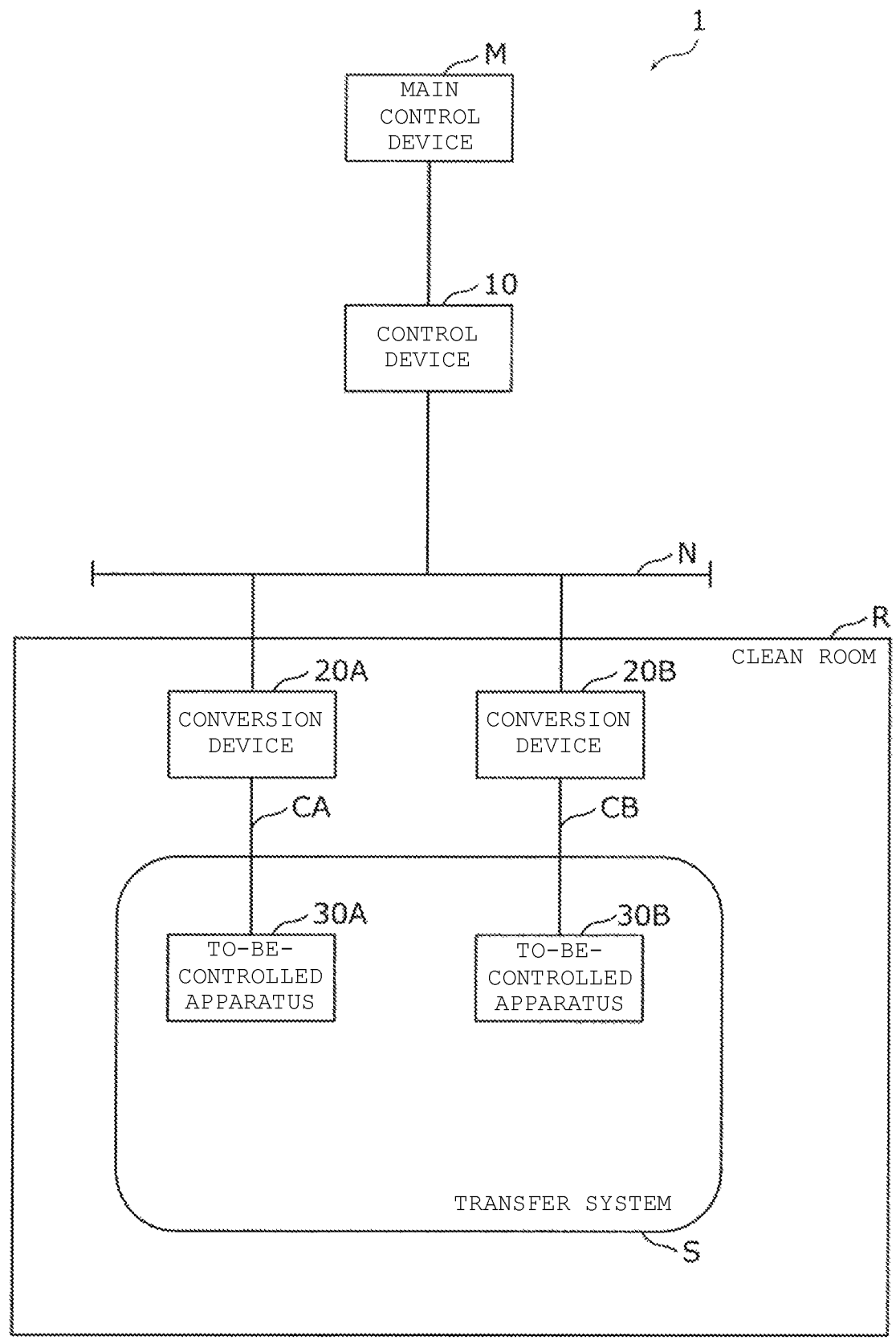
FIG. 1 is a block diagram illustrating a configuration of a control system according to a preferred embodiment of the present invention.

Hereinafter, preferred embodiments of the present invention will be described in detail with reference to the drawings.

The preferred embodiments to be described below corresponds to preferable specific examples of the present invention. Numerical values, shapes, materials, elements, placement positions and connection modes of the elements, steps, order of the steps, and the like described in the following preferred embodiments are merely examples and are not intended to limit the present invention. Among the elements in the following preferred embodiments, elements not set forth in the independent claims indicating the top level concept of the present invention will be described as optional elements that relate to a more preferable preferred embodiment.

Note that the same elements are denoted by the same reference numerals, and the description thereof may be omitted.

In a present preferred embodiment of the present invention, a control system and the like that achieve reductions in maintenance costs of a clean room will be described.

First, a configuration of the control system according to the present preferred embodiment will be described based on comparison with a control system according to the related art.

FIG. 1 is a block diagram illustrating a configuration of a control system 1 according to the present preferred embodiment.

As illustrated in FIG. 1, the control system 1 includes a main control device M, a control device 10, conversion devices 20A and 20B, and to-be-controlled apparatuses 30A and 30B. The main control device M and the control device 10 are disposed outside a clean room R. The conversion devices 20A and 20B, and the to-be-controlled apparatuses 30A and 30B are disposed in the clean room R.

The control system 1 is a control system that controls a transfer system S. More specifically, the control system 1 controls the to-be-controlled apparatuses 30A and 30B, and the like included in the transfer system S to cause the transfer system S to transfer articles or to perform processing on the articles, and the like. Herein, the transfer system S is a transfer system disposed in the clean room R and is specifically, for example, a transfer system used in a semiconductor manufacturing process.

The clean room R is a space with less particulates in air than spaces in the natural environment, that is, a space with a higher degree of cleanliness. For example, the space has cleanliness of any one of cleanliness classes 1 to 9 prescribed in ISO 14644-1.

The main control device M preferably is a computer that manages an entire semiconductor production facility in the clean room R and controls the transfer system S. The main control device M generates a control command to control the transfer system S and transmits the control command thus generated to the control device 10.

The control device 10 preferably is a computer that controls the to-be-controlled apparatuses 30A and 30B through Ethernet communication so as to control the transfer system S in accordance with the control command received from the main control device M. More specifically, the control device 10 determines a specific operation to be performed by the to-be-controlled apparatuses 30A and 30B so that the transfer system S operates in accordance with a transfer plan of articles received from the main control device M. Then, the control device 10 generates control data for the operation and transmits the control data thus generated to a network N by Ethernet communication. For example, the control device 10 sets the control data as a payload of an Internet Protocol (IP) packet, that is, encapsulates the control data in the IP packet, and transmits, by Ethernet communication, the control data. A destination of the control data to be transmitted is the conversion device 20A when a control target is the to-be-controlled apparatus 30A and is the conversion device 20B when the control target is the to-be-controlled apparatus 30B. Note that the control data may be broadcast from the control device 10. The control device 10 can be configured with hardware and circuitry such as a personal computer (PC).

The conversion device 20A is a conversion device that mutually converts communication data on Ethernet communication and communication data on serial communication. The conversion device 20A is connected to the control device 10 via the network N and is connected to the to-be-controlled apparatus 30A via a serial cable CA. When receiving the control data transmitted by the control device 10 via the network N, the conversion device 20A converts the control data thus received into a serial communication format and transmits the control data thus converted to the to-be-controlled apparatus 30A. When the control data encapsulated in an IP packet is transmitted, the conversion device 20A extracts the control data from the IP packet, that is, decapsulates the control data and performs the above-described conversion. Further, when receiving response data transmitted by the to-be-controlled apparatus 30A via the serial cable CA, the conversion device 20A converts the response data thus received into an Ethernet communication format and transmits the response data thus converted to the control device 10.

Note that the conversion device 20A is described as a conversion device that mutually converts communication data on Ethernet communication and communication data on serial communication in the control system 1 according to the present preferred embodiment, but the conversion device 20A is applicable not only to serial communication but also to communication standards belonging to legacy device interfaces (for example, parallel communication).

An information processing throughput performed by the conversion device 20A is lower than an information processing throughput performed by the control device 10, so that the conversion device 20A can be realized as a device that is smaller in size than the control device 10. For example, assuming that the control device 10 is configured with a desktop PC, a monitor, a mouse, and a keyboard, the conversion device 20A can be configured with, for example, a small PC, a so-called box PC or a mini PC.

The conversion device 20A preferably is such a small PC or the like, so that the conversion device 20A is able to be attached to a housing of the to-be-controlled apparatus 30A and thus eliminates the need for furniture or the like on which the conversion device 20A is installed in the clean room R.

The conversion device 20B is a conversion device that is similar in capability to the conversion device 20A. The conversion device 20B is connected to the control device 10 via the network N and is connected to the to-be-controlled apparatus 30B via a serial cable CB. The conversion device 20B converts control data and response data exchanged between the control device 10 and the to-be-controlled apparatus 30B and transmits and receives the data thus converted in the same manner as the conversion device 20A.

The to-be-controlled apparatus 30A is an apparatus that is controlled via serial communication, transfers articles (including containers such as a front-opening unified pod (FOUP) and a POD containing semiconductor wafers) in the transfer system S and performs processing on the articles. The to-be-controlled apparatus 30A is a device that controls an unmanned overhead carrier traveling along a track suspended from a ceiling of the clean room R or an unmanned carrier traveling along a track on a floor of the clean room R. The to-be-controlled apparatus 30A may be configured or programmed to define a processor that applies various physical or chemical treatments to semiconductor wafers. The to-be-controlled apparatus 30A operates under control of the control device 10. The to-be-controlled apparatus 30A is connected to the control device 10 via the serial cable CA. The to-be-controlled apparatus 30A receives control data transmitted from the control device 10 and converted into communication data on serial communication by the conversion device 20A, and operates in accordance with to the control data thus received.

The to-be-controlled apparatus 30B is an apparatus that is similar in capability to the to-be-controlled apparatus 30A. The to-be-controlled apparatus 30B is connected to the conversion device 20B via the serial cable CB and operates under control of the control device 10.

The network N preferably is a network conforming to the Ethernet communication standard. More specifically, the network N is configured with a twisted pair cable used for the Ethernet communication standard such as 10/100/1000 BASE-T and a communication apparatus (not illustrated) such as a repeater, an Ethernet hub or a router. Although a maximum distance which one twisted pair cable can carry communication is regulated to 100 meters, establishing connection using the above-described communication apparatus enables communication with a remote location separated by 100 meters or more.

The serial cable CA connects the conversion device 20A and the to-be-controlled apparatus 30A so that serial communication is possible. The serial communication standard is, for example, RS-232C or RS-485. A transmission distance of the serial cable CA is much shorter than a transmission distance of the network N. Therefore, it is convenient for the conversion device 20A connected to the to-be-controlled apparatus 30A via the serial cable CA or the like to be disposed in the clean room R where a physical distance from the to-be-controlled apparatus 30A is relatively short. The above description of the serial cable CA also applies to the serial cable CB.

Note that a description has been given herein of a configuration where the control system 1 includes two conversion devices and two to-be-controlled apparatuses; however, the control system 1 may include three or more of conversion devices and to-be-controlled apparatuses, for example, several tens or hundreds of conversion devices and to-be-controlled apparatuses. Further, a plurality of control devices 10 may be connected under one main control device M, or the main control device M and the control device 10 may be both directly connected to the network N.

Figure 2:
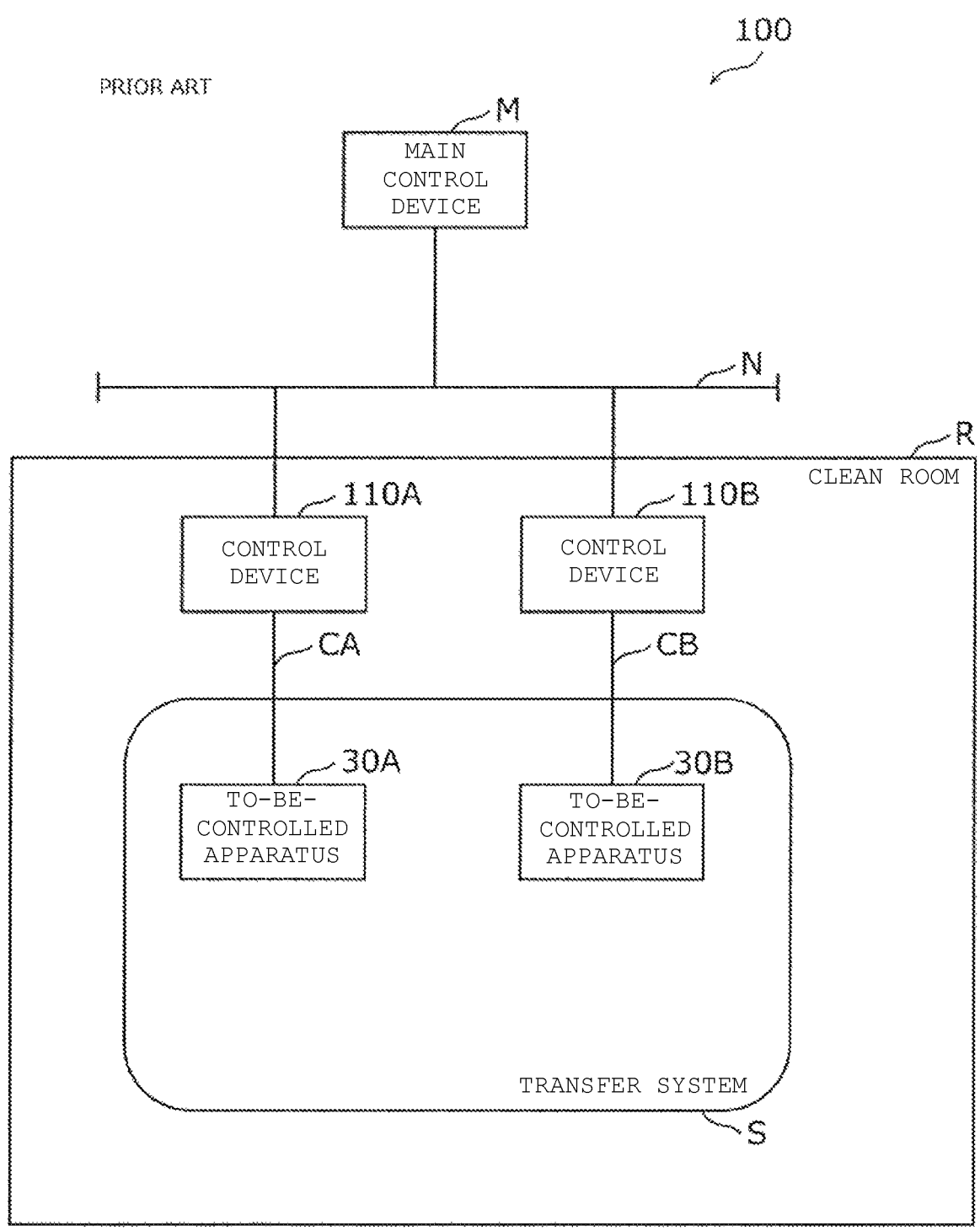
FIG. 2 is a block diagram illustrating a configuration of an existing control system.

FIG. 2 is a block diagram illustrating a configuration of an existing control system 100. The existing control system 100 is a control system designed to perform control similar to that of the control system 1 without using the conversion devices 20A and 20B illustrated in FIG. 1.

As illustrated in FIG. 2, the control system 100 includes a main control device M, control devices 110A and 110B, and to-be-controlled apparatuses 30A and 30B. The main control device M is disposed outside a clean room R, and the control devices 110A and 110B and the to-be-controlled apparatuses 30A and 30B are disposed in the clean room R. Note that the same reference numerals are given to the same elements as those illustrated in FIG. 1, and detailed descriptions thereof will be omitted.

The control system 100 differs from the control system 1 illustrated in FIG. 1 in that the control system 100 does not include the conversion devices 20A or 20B but includes the two control devices 110A and 110B.

The control device 110A is a control device that controls the to-be-controlled apparatus 30A. The control device 110A generates control data for the to-be-controlled apparatus 30A in the same manner as the control device 10. Then, the control device 110A directly transmits the control data thus generated to the to-be-controlled apparatus 30A by serial communication via the serial cable CA. The control device 110B is a control device that controls the to-be-controlled apparatus 30B. Details of the control device 110B are the same as the details of the control device 110A.

As described above, since the transmission distance of the serial cable CA or the like is relatively short, the control device 110A connected to the to-be-controlled apparatus 30A via the serial cable CA or the like needs to be disposed in the clean room R where a physical distance from the to-be-controlled apparatus 30 is relatively short. In other words, it can be said that there are substantial restrictions in that the control devices 110A and 110B, and furniture such as chairs and desks on which the control devices 110A and 110B are placed, need to be disposed in the clean room R.

A result of comparison of the configuration of the control system 1 illustrated in FIG. 1 with the configuration of the existing control system 100 illustrated in FIG. 2 reveals an advantage that the configuration of the control system 1 allows a space occupied by devices in the clean room R to be reduced. Since there is no restriction that the control device 10 must be disposed in the clean room R, the control device 10 is disposed outside the clean room R, and the conversion devices 20A and 20B, which can be defined by hardware smaller than the control device 10 as described above, are disposed in the clean room R.

Note that, when the control devices 110A and 110B of the control system 100 preferably are simply integrated into a single control device 10, the single control device 10 must include serial communication connectors equal in number to the number of to-be-controlled apparatuses. However, it is not realistic for the single control device 10 to include, for example, tens or hundreds of serial communication connectors.

Therefore, the control device 10 of the control system 1 is configured such that a function corresponding to one control device 110A or the like is implemented as one software module and a plurality of the software modules each performing communication data over Ethernet. This configuration has an advantage that a single control device 10 need not include, for example, tens or hundreds of serial communication connectors.

A specific configuration example of such a control system 1 will be described in detail below.

Figure 3:
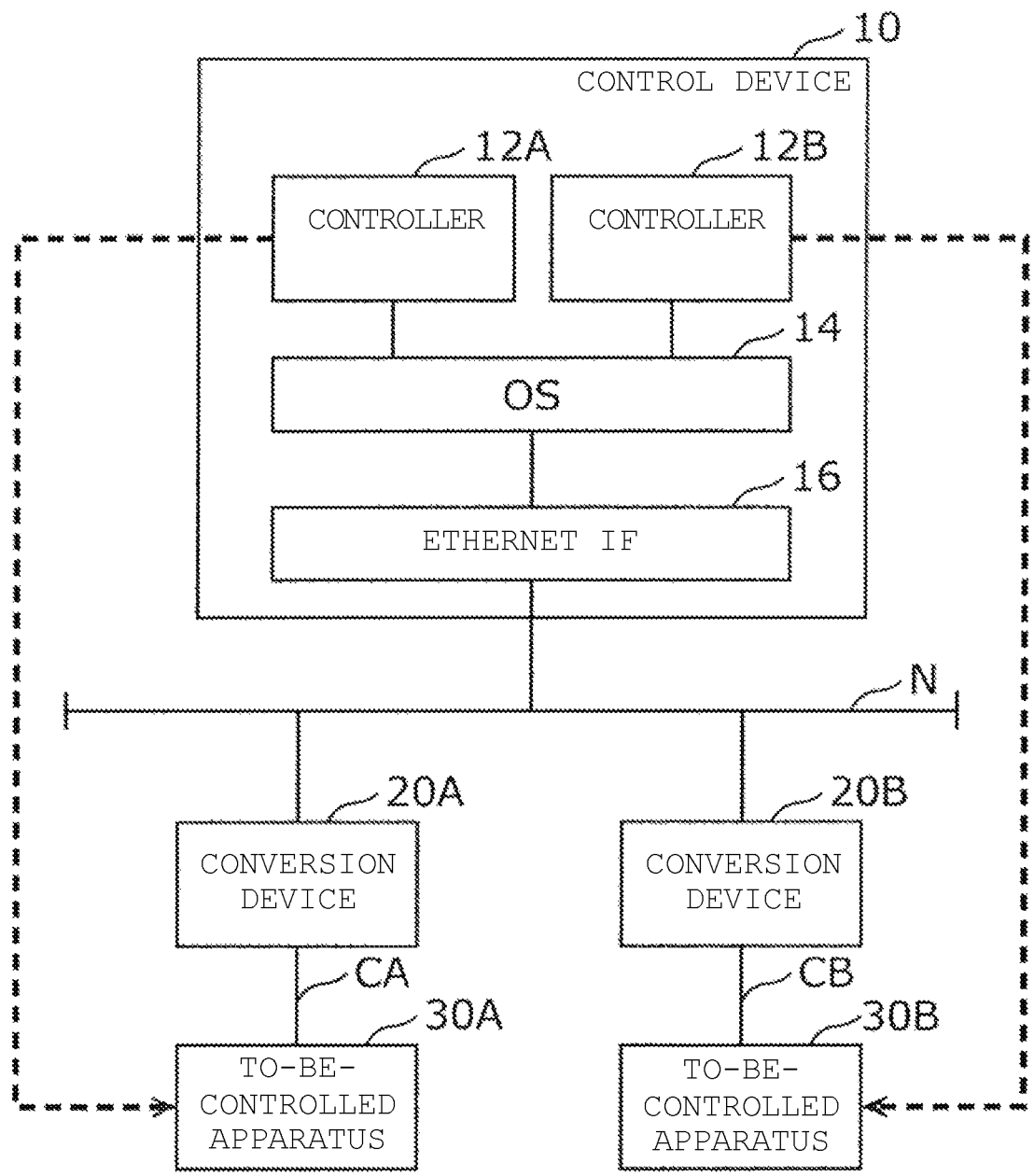
FIG. 3 is a block diagram illustrating a first example of a specific configuration of a control device according to a preferred embodiment of the present invention.

FIG. 3 is a block diagram illustrating a first example of a specific configuration of the control device 10 according to the present preferred embodiment. FIG. 3 illustrates the control device 10, the conversion devices 20A and 20B, and the to-be-controlled apparatuses 30A and 30B in the control system 1 illustrated in FIG. 1. Further, dashed arrows in FIG. 3 each indicate a control target of a controllers 12A or 12B.

As illustrated in FIG. 3, the control device 10 includes the controllers 12A and 12B, an operating system (OS) 14, and an Ethernet interface (IF) 16.

The controller 12A preferably is a processor implemented as a software application that performs processing to control the to-be-controlled apparatus 30A. Specifically, the controller 12A generates control data to control the to-be-controlled apparatus 30A, and transmits the control data thus generated via the OS 14 and the Ethernet IF 16. An address of the conversion device 20A is set to a destination address field included in the control data transmitted by the controller 12A. The controller 12A can be implemented via a predetermined program that is executed by a processor using a memory or the like.

The controller 12B preferably is a processor implemented as a software application that performs processing to control the to-be-controlled apparatus 30B. The controller 12B is the same as the controller 12A except that the control target is the to-be-controlled apparatus 30B.

The OS 14 is basic software that runs on hardware of the computer defining and functioning as the control device 10. The OS 14 is, for example, Windows (registered trademark) or Linux (registered trademark).

The Ethernet IF 16 is an interface to transmit and receive frames to and from the network N, the Ethernet IF 16 conforming to the Ethernet communication standard. More specifically, the Ethernet IF 16 includes a communication circuit that transmits and receives Ethernet frames in accordance with a communication procedure corresponding to carrier sense multiple access/collision detection (CSMA/CD) and a connector to which a twisted pair cable used for the Ethernet communication standard such as 10/100/1000 BASE-T is connected. The Ethernet IF 16 operates under control of the OS 14.

The conversion devices 20A and 20B perform serial communication with the to-be-controlled apparatuses 30A and 30B, respectively. Further, the controllers 12A and 12B perform Ethernet communication with the conversion devices 20A and 20B, respectively.

The control data on the Ethernet communication transmitted by the controller 12A via the Ethernet IF 16 is converted into control data in the serial communication format by the conversion device 20A and is then transmitted to the to-be-controlled apparatus 30A. The control data transmitted by the controller 12B is likewise transmitted to the to-be-controlled apparatus 30B.

As described above, in the control system 1, the control device 10, the conversion device 20A, and the like, control each of the to-be-controlled apparatuses 30A and 30B while reducing the maintenance cost of the clean room. Specifically, since there is no restriction that the control device 10 must be disposed in the clean room R, a space occupied by devices of the control system 1 in the clean room R is able to be reduced. Further, a number of computers of the control system 1 is able to be reduced. It is also an advantage that this configuration does not need virtualization software (described later).

Figure 4:
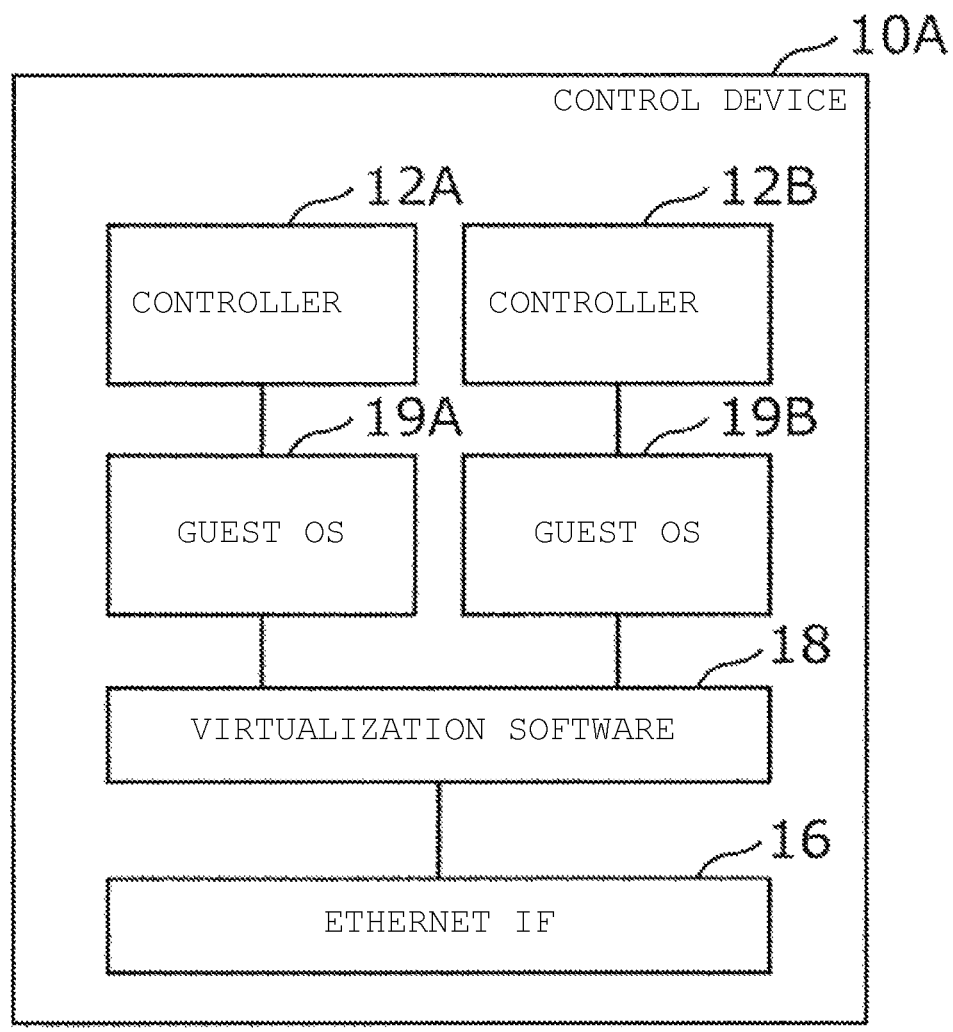
FIG. 4 is a block diagram illustrating a second example of a specific configuration of a control device according to a preferred embodiment of the present invention.

FIG. 4 is a block diagram illustrating a control device 10A as a second example of the specific configuration of the control device 10 according to the present preferred embodiment. FIG. 4 illustrates a portion corresponding to the control device 10 included in the control system 1 illustrated in FIG. 1.

As illustrated in FIG. 4, the control device 10A includes controllers 12A and 12B, guest OSs 19A and 19B, an Ethernet IF 16, and virtualization software 18. The control device 10A is capable of performing the same functions as the control device 10 illustrated in FIG. 3 has.

The virtualization software 18 is virtualization software that runs on hardware of a computer defining and functioning as the control device 10A. The virtualization software 18 can be implemented via virtualization software running on a host OS, or can be implemented via a hypervisor running on hardware.

The guest OSs 19A and 19B are each an OS running on the virtualization software 18, specifically, for example, Windows or Linux. On the guest OSs 19A and 19B, the controllers 12A and 12B run, respectively.

Such a configuration has an advantage that, even when the controllers 12A and 12B are implemented via pieces of software running on different OSs, a single control device 10A is able to control the to-be-controlled apparatuses 30A and 30B.

As described above, in the control system 1, the control device 10A, the conversion device 20A, and the like control each of the to-be-controlled apparatuses 30A and 30B while reducing the maintenance cost of the clean room. Specifically, since there is no restriction that the control device 10A must be disposed in the clean room R, a space occupied by devices of the control system 1 in the clean room R is able to be reduced. Further, a number of computers of the control system 1 is able to be reduced. It is also an advantage that a number of control devices is able to be reduced in a configuration where controllers implemented via a plurality of pieces of software running on different OSs are operated by a single control device.

Figure 5:
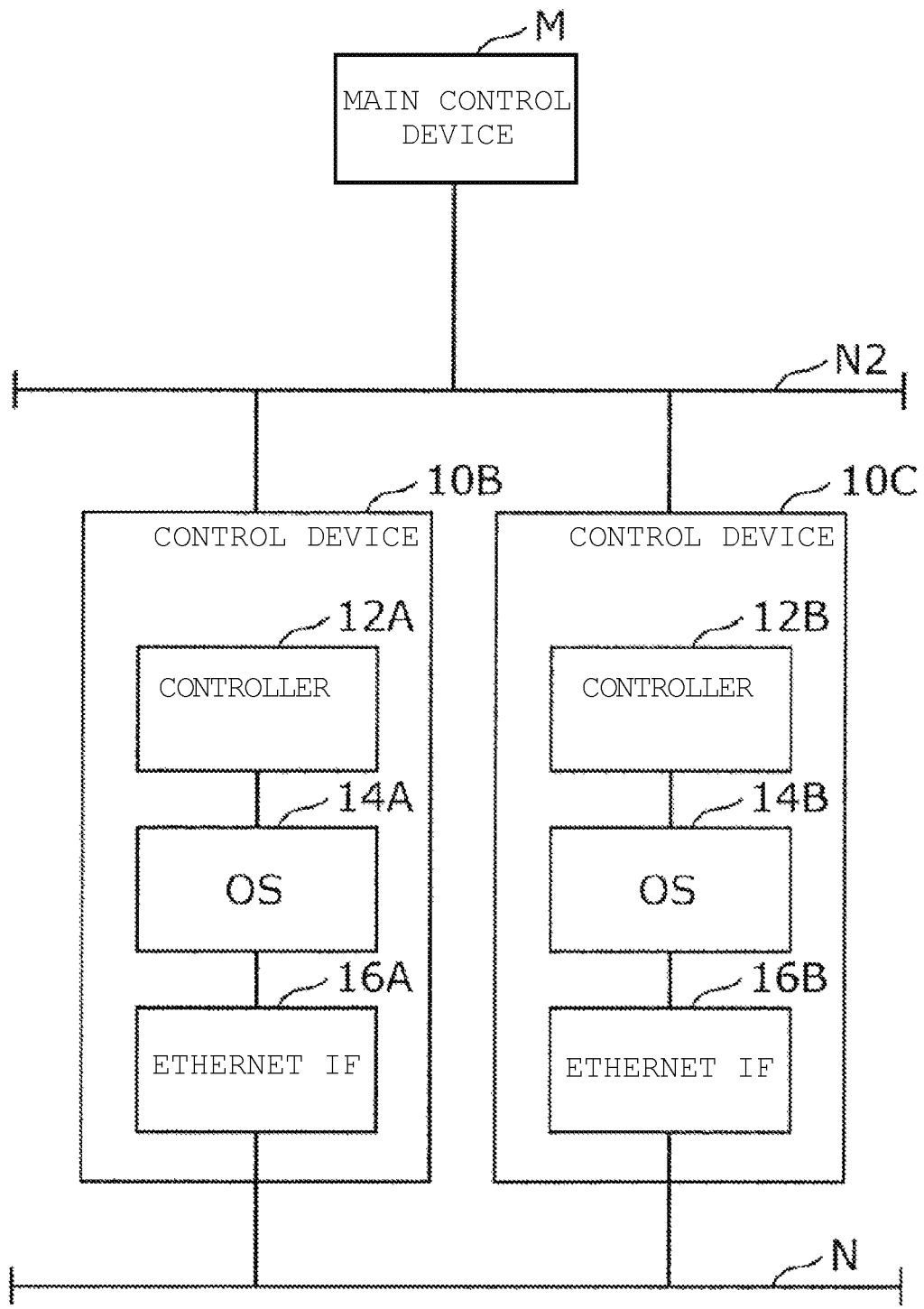
FIG. 5 is a block diagram illustrating a third example of a specific configuration of a control device according to a preferred embodiment of the present invention.

FIG. 5 is a block diagram illustrating control devices 10B and 10C as a third example of the specific configuration of the control device 10 according to the present preferred embodiment. FIG. 5 illustrates a portion corresponding to the main control device M and the control device 10 illustrated in FIG. 1.

As illustrated in FIG. 5, the control device 10B includes a controller 12A, an OS 14A, and an Ethernet IF 16A. Further, the control device 10C includes a controller 12B, an OS 14B, and an Ethernet IF 16B. The control devices 10B and 10C are connected to the main control device M via a network N2.

In such a configuration, the controllers 12A and 12B are implemented via pieces of software running on different control devices. Therefore, this configuration allows a different OS to be used for each of the control devices. Further, since each of the control devices performs processing on a corresponding to-be-controlled apparatus, processing loads on the control devices 10B and 10C are able to be reduced. It is also an advantage that a simplified configuration makes it possible to simplify an operation and enhance fault tolerance.

As described above, in the control system 1, the control device 10A, the conversion device 20A, and the like control each of the to-be-controlled apparatuses 30A and 30B while reducing the maintenance cost of the clean room. Specifically, this configuration has an advantage that the processing load on each control device is able to be reduced, and the simplified configuration makes it possible to simplify the operation and enhance the fault tolerance.

Figure 6:
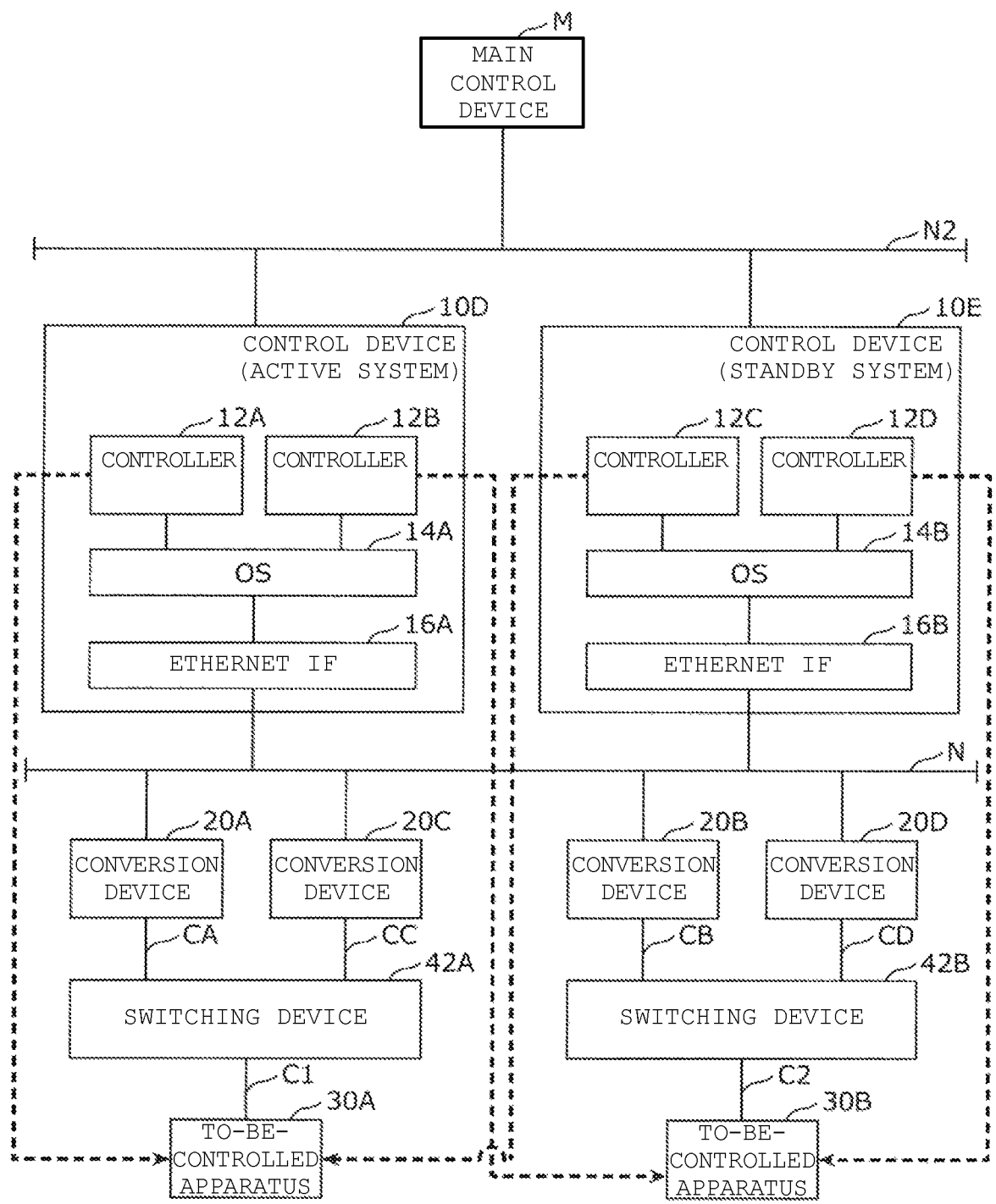
FIG. 6 is a block diagram illustrating a fourth example of a specific configuration of a control device according to a preferred embodiment of the present invention.

FIG. 6 is a block diagram illustrating control devices 10D and 10E as a fourth example of the specific configuration of the control device 10 according to the present preferred embodiment. FIG. 6 illustrates a portion corresponding to the control device 10, the conversion devices 20A and 20B, and the to-be-controlled apparatuses 30A and 30B in the control system 1 illustrated in FIG. 1. Further, dashed arrows in FIG. 6 indicate control targets of controllers 12A to 12D.

As illustrated in FIG. 6, the control device 10D includes the controllers 12A and 12B, an OS 14A, and an Ethernet IF 16A. Further, the control device 10E includes the controllers 12C and 12D, an OS 14B, and an Ethernet IF 16B. The control devices 10D and 10E are connected to the main control device M via the network N2.

Further, in this configuration, the control system 1 includes four conversion devices 20A, 20B, 20C and 20D and two switching devices 42A and 42B.

A destination of control data transmitted by the controller 12A is the conversion device 20A. A destination of control data transmitted by the controller 12B is the conversion device 20B. A destination of control data transmitted by the controller 12C is the conversion device 20C. A destination of control data transmitted by the controller 12D is the conversion device 20D.

Each of the control device 10D and the control device 10E has the same configuration as the control device 10 illustrated in FIG. 3. Further, the control device 10D and the control device 10E have a redundant configuration. That is, the control device 10D and the control device 10E are controlled such that one of the control device 10D and the control device 10E serves as an active system and the other serves as a standby system. Like the control device 10 illustrated in FIG. 3, a control device defining and functioning as the active system receives a control command from the main control device M, and then generates and transmits control data. A control device defining and functioning as the standby system does not perform such processing. When a failure occurs in the control device defining and functioning as the active system, the control device defining and functioning as the standby system switches to the active system and operates. Note that, at this time, the control device used to serve as the active system may switch to the standby system.

The switching device 42A is a switching device disposed on serial cables connecting each of the conversion devices 20A and 20C and the to-be-controlled apparatus 30A. The switching device 42A switches signal paths so that the control data from one of the conversion devices 20A and 20C reaches the to-be-controlled apparatus 30A, thus the control data from one of the control devices 10D and 10E defining and functioning as the active system is transmitted to the to-be-controlled apparatus 30A.

The switching device 42B is a switching device disposed on serial cables connecting each of the conversion devices 20B and 20D and the to-be-controlled apparatus 30B. The switching device 42B performs the same processing as the switching device 42A does, so that the control data from one of the control devices 10D and 10E defining and functioning as the active system is transmitted to the to-be-controlled apparatus 30B.

In such a configuration, the switching devices 42A and 42B transmits the control data from one of the control devices 10D and 10E defining and functioning as the active system to the to-be-controlled apparatuses 30A and 30B.

As described above, in the control system 1, the control device 10D and the like, the conversion device 20A and the like control each of the to-be-controlled apparatuses 30A and 30B while reducing the maintenance cost of the clean room. Specifically, since there is no restriction that the control devices 10D and 10E are disposed must be disposed in the clean room R, a space occupied by devices of the control system 1 in the clean room R is able to be reduced. It is also an advantage that making a control device redundant enhances fault tolerance.

Next, a technique relating to control of control data transmission performed by the control device 10 will be described.

A transmission speed of the network N is, for example, about 10 to 1000 Mbps, and a transmission speed of serial communication is, for example, about 240 to 92160 bps. That is, the transmission speed of the network N is overwhelmingly higher than the transmission speed of the serial communication. Therefore, when control data is transmitted from the control device 10 to the conversion device 20 at a data rate higher than a data rate from the conversion device 20 to the to-be-controlled apparatus 30, the control data is forced to be retained in the conversion device 20. An excessive amount of control data retained in the conversion device 20 causes a possibility that a buffer will overflow and may be a factor that increases a delay in arrival of the control data and reduces immediacy of the control. In contrast, an excessive amount of control data retained causes the buffer to become empty and brings about a state in which control data is not transmitted from the conversion device 20 to the to-be-controlled apparatus 30. Therefore, a technique to regulate the amount of control data to be retained in the conversion device 20 to an appropriate amount will be described below.

Figure 7:
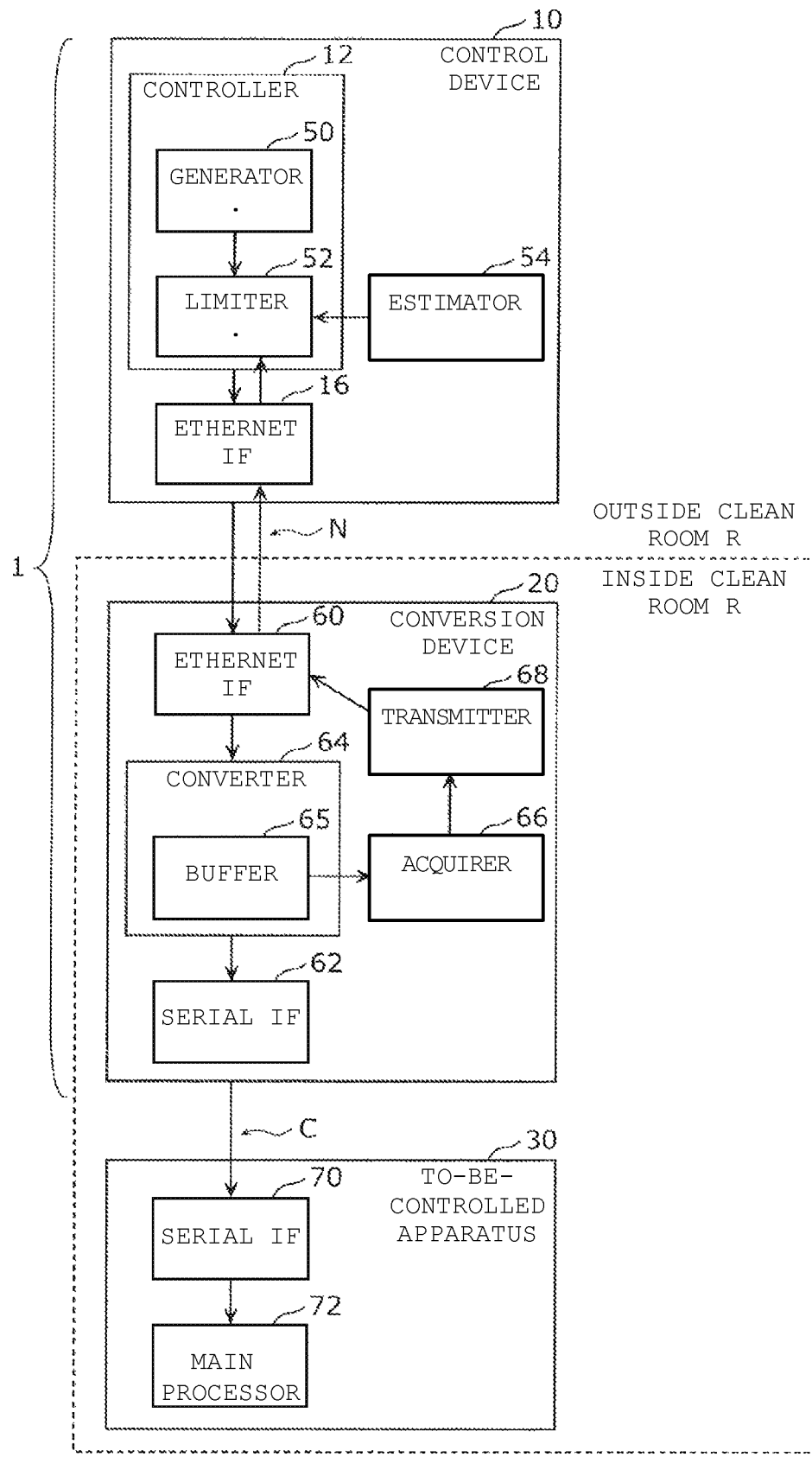
FIG. 7 is a block diagram illustrating a functional configuration of a control system according to a preferred embodiment of the present invention.

FIG. 7 is a block diagram illustrating details of a functional configuration of the control system 1 according to the present preferred embodiment. In FIG. 7, in addition to the control device 10 and the conversion device 20 included in the control system 1, a functional configuration of the to-be-controlled apparatus 30 is also illustrated; thus, a description of the functional configuration will be also described below. Here, the control device 10 is installed outside the clean room R, and the conversion device 20 and the to-be-controlled apparatus 30 are installed in the clean room R. Further, the to-be-controlled apparatus 30 includes not only a traveling carrier such as an overhead traveling vehicle or an unmanned traveling vehicle, but also a processing device such as a semiconductor manufacturing device.

As illustrated in FIG. 7, the control device 10 includes a controller 12, the Ethernet IF 16, and an estimator 54.

The controller 12 is a processor that performs processing to control the to-be-controlled apparatus 30. Specifically, the controller 12 generates control data to control an operation of the to-be-controlled apparatus 30, and transmits the control data thus generated via the Ethernet IF 16. For example, the controller 12 encapsulates the control data into an IP packet and transmits the IP packet. The address of the conversion device 20 is set to the destination address field included in the control data transmitted by the controller 12. The controller 12 can be implemented via a predetermined program that is executed by a processor using a memory or the like.

The controller 12 is configured or programmed to include a generator 50 and a limiter 52.

The generator 50 is a processor that generates the control data to control the to-be-controlled apparatus 30 and transmits the control data thus generated via the Ethernet IF 16.

The limiter 52 is a processor that limits a transmission data rate of the control data to be transmitted by the generator to a rate equal to or less than a predetermined maximum transmission rate. For example, the limiter 52 may adjust the transmission data rate of the control data to be transmitted by the generator 50 based on consumption of a buffer 65 estimated by the estimator 54. In this configuration, the limiter 52 transmits the control data only when the consumption of the buffer 65 is smaller than a threshold Th1, then adjusts the transmission data rate of the control data. The threshold Th1 is able to be optionally determined from, for example, values equal to or less than a maximum storage capacity of the buffer 65 (for example, about 70% to about 80% of the maximum storage capacity). Further, the threshold Th1 may be a value corresponding to the transmission speed of serial communication between the conversion device 20 and the to-be-controlled apparatus 30 (for example, the amount of data carried by serial communication within a predetermined time). The limiter 52 may be implemented via a function of a device driver of the Ethernet IF 16 or may be implemented via different software. Among the functions of the limiter 52, a function of limiting the transmission data rate through adjustment based on the consumption of the buffer 65 estimated as described above is referred to as a first limiter.

Further, in addition to the above operation, when the limiter 52 has predetermined the maximum transmission rate as a value greater than the transmission speed of serial communication between the conversion device 20 and the to-be-controlled apparatus 30 and then receives a suppression command and a return command (described later) transmitted from the conversion device 20, the limiter 52 may change the maximum transmission rate in accordance with the commands. Specifically, when receiving the suppression command from the conversion device 20, the limiter 52 may change the maximum transmission rate to a value less than a transmission rate in a normal mode. More specifically, the limiter 52 may set the maximum transmission rate to zero. Further, when receiving the return command from the conversion device 20, the limiter 52 may change the maximum transmission rate to a value greater than the transmission speed of serial communication between the conversion device 20 and the to-be-controlled apparatus 30. As described above, this configuration makes it possible to prevent the buffer 65 of the conversion device 20 from overflowing and becoming empty based on the commands transmitted from the conversion device 20. Among the functions of the limiter 52, as described above, a function of limiting the transmission data rate based on the suppression command and the return command is referred to as a second limiter.

Note that an operation mode of the limiter 52 may be expressed as either "normal mode" or "suppression mode". The limiter 52 transitions to the suppression mode when receiving the suppression command and transitions to the normal mode when receiving the return command in the suppression mode.

Note that the limiter 52 may enable only one or both of the first limiter and the second limiter. When the limiter 52 enables both of the first limiter and the second limiter, a lower one of the transmission data rate determined by the first limiter and the transmission data rate determined by the second limiter is used as the maximum value of the transmission data rate of the control data to be transmitted by the generator 50.

The estimator 54 is a processor that estimates the consumption of the buffer 65 included in the conversion device 20. There are various methods to cause the estimator 54 to estimate the consumption of the buffer 65. For example, the estimator 54 accumulates transmission data amounts of the control data transmitted via the limiter 52 and the Ethernet IF 16 to estimate the consumption of the buffer 65. Specifically, a point in time at which the consumption of the buffer 65 is zero is set as a reference time point, a total amount of the control data transmitted via the Ethernet IF 16 from the reference time point to the present time point is set as a data amount D1, a total amount of the control data transmitted by the conversion device 20 to the to-be-controlled apparatus 30 from the reference time point to the present time point is set as a data amount D2, and consumption BD of the buffer 65 is estimated by the following (Equation 1).

$$BD = D1 - D2 \qquad \text{(Equation 1)}$$

Note that, in addition to the above method, the estimator 54 may receive notification of actual consumption of the buffer 65 at the present time point or at a past time point ranging from several seconds before to several minutes before from an acquirer 66 of the conversion device 20 to estimate the consumption of the buffer 65 at the present time point.

The Ethernet IF 16 is an Ethernet IF that communicably connects to the network N. The Ethernet IF 16 is connected to an Ethernet IF 60 of the conversion device 20 via the network N.

Further, the conversion device 20 includes the Ethernet IF 60, a serial IF 62, a converter 64, the acquirer 66, and a transmitter 68.

The Ethernet IF 60 is an Ethernet IF that communicably connects to the network N based on Ethernet. The Ethernet IF 60 is connected to the Ethernet IF 16 of the control device 10 via the network N.

The serial IF 62 is a serial communication interface conforming to the serial communication standard (for example, RS-232C, RS-485, or the like). The serial IF 62 is connected to a serial IF 70 of the to-be-controlled apparatus 30 via a serial cable C.

The converter 64 is a processor that mutually converts communication data on Ethernet communication and communication data on serial communication. Specifically, the converter 64 receives the control data from the control device 10 via the Ethernet IF 60, converts the control data thus received into the serial communication format, and transmits the control data thus converted to the to-be-controlled apparatus 30 via the serial IF 62. When the control data is encapsulated in an IP packet, the converter 64 first decapsulates the control data and then performs the conversion. Further, the converter 64 receives the control data from the to-be-controlled apparatus 30 via the serial IF 62, converts the control data thus received into the Ethernet communication format, and transmits the control data thus converted to the control device 10 via the Ethernet IF 60.

The converter 64 further includes the buffer 65. The buffer 65 is a storage device that temporarily holds the control data received from the control device 10 until the control data is transmitted to the to-be-controlled apparatus 30.

The acquirer 66 is a processor that acquires the consumption of the buffer 65. The consumption is a data amount of data stored in the buffer 65 and may be expressed in units of data amount (for example, [kB] or [MB]) or may be expressed as a percentage of the data amount with respect to the maximum storage capacity of the buffer 65 (for example, [%]).

The transmitter 68 is a processor that transmits the suppression command and the return command to the control device 10 based on the consumption of the buffer 65. Note that the suppression command is also referred to as first information, and the return command is also referred to as second information.

Specifically, the transmitter 68 transmits the first information (that is, the suppression command) indicating that the consumption of the buffer 65 acquired by the acquirer 66 is greater than a first threshold (also referred to as a threshold Th2) to the control device 10. After transmitting the first information, the transmitter 68 transmits the second information (that is, the return command) indicating that the consumption of the buffer 65 acquired by the acquirer 66 is less than a second threshold (also referred to as a threshold Th3) to the control device 10.

Further, the to-be-controlled apparatus 30 includes the serial IF 70 and a main processor 72.

The serial IF 70 is a serial communication interface conforming to the serial communication standard. The serial IF 70 is connected to the serial IF 62 of the conversion device 20 via the serial cable C.

The main processor 72 is an apparatus main processor of the to-be-controlled apparatus 30. For example, when the to-be-controlled apparatus 30 is an apparatus that performs processing on articles, such as a semiconductor manufacturing facility, a portion corresponding to the function of performing the processing corresponds to the main processor 72. The main processor 72 operates under control based on the control data received from the control device 10 via the conversion device 20.

The processing of the control system 1 described above will be described below.

Figure 8:
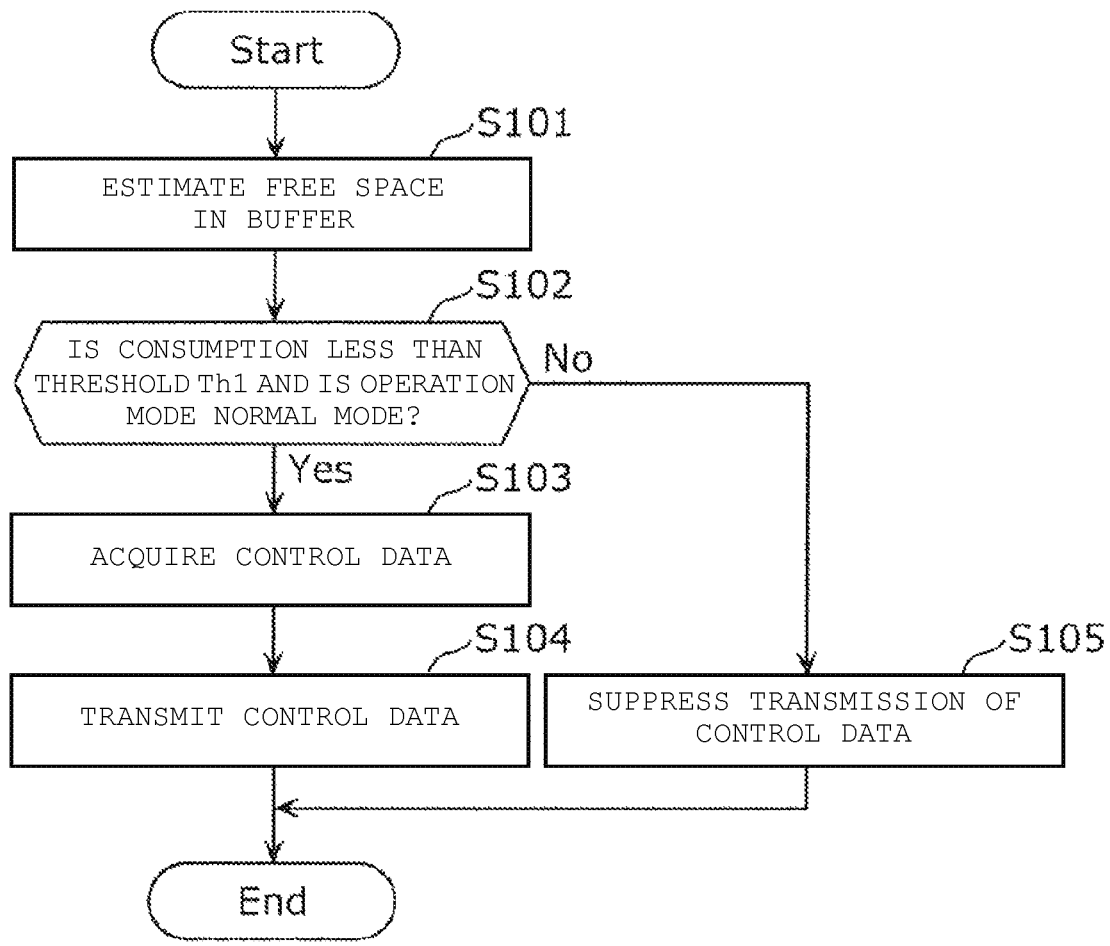
FIG. 8 is a flowchart illustrating processing of a control device according to a preferred embodiment of the present invention.

FIG. 8 is a flowchart illustrating the processing of the control device 10 according to the present preferred embodiment. Note that a series of processes illustrated in FIG. 8 is repeatedly executed by the control device 10.

In step S101, the estimator 54 estimates the consumption of the buffer 65 of the conversion device 20. The estimation of the consumption of the buffer 65 is performed, for example, by using the above-described (Equation 1).

In step S102, the limiter 52 acquires the consumption of the buffer 65 estimated by the estimator 54. Then, the limiter 52 determines whether the consumption is less than the threshold Th1 and whether the operation mode is the normal mode. When the limiter 52 determines in step S102 that the consumption is less than the threshold Th1 and the operation mode is the normal mode (Yes in step S102), the processing proceeds to step S103. Otherwise (No in step S102), the processing proceeds to step S105.

In step S103, the limiter 52 acquires the control data generated by the generator 50.

In step S104, the limiter 52 transmits the control data acquired in step S103 to the conversion device 20 via the Ethernet IF 16. At this time, the limiter 52 limits the data rate of the control data to be transmitted to the conversion device 20 to a rate equal to or less than the predetermined maximum transmission rate. The maximum transmission rate is set to a value greater than the transmission speed of serial communication between the conversion device 20 and the to-be-controlled apparatus 30.

In step S105, the limiter 52 suppresses the transmission of the control data, which in turn suppresses the transmission of the control data to the conversion device 20 via the Ethernet IF 16.

After step S104 or S105 is executed, the series of processes illustrated in FIG. 8 comes to an end.

Figure 9:
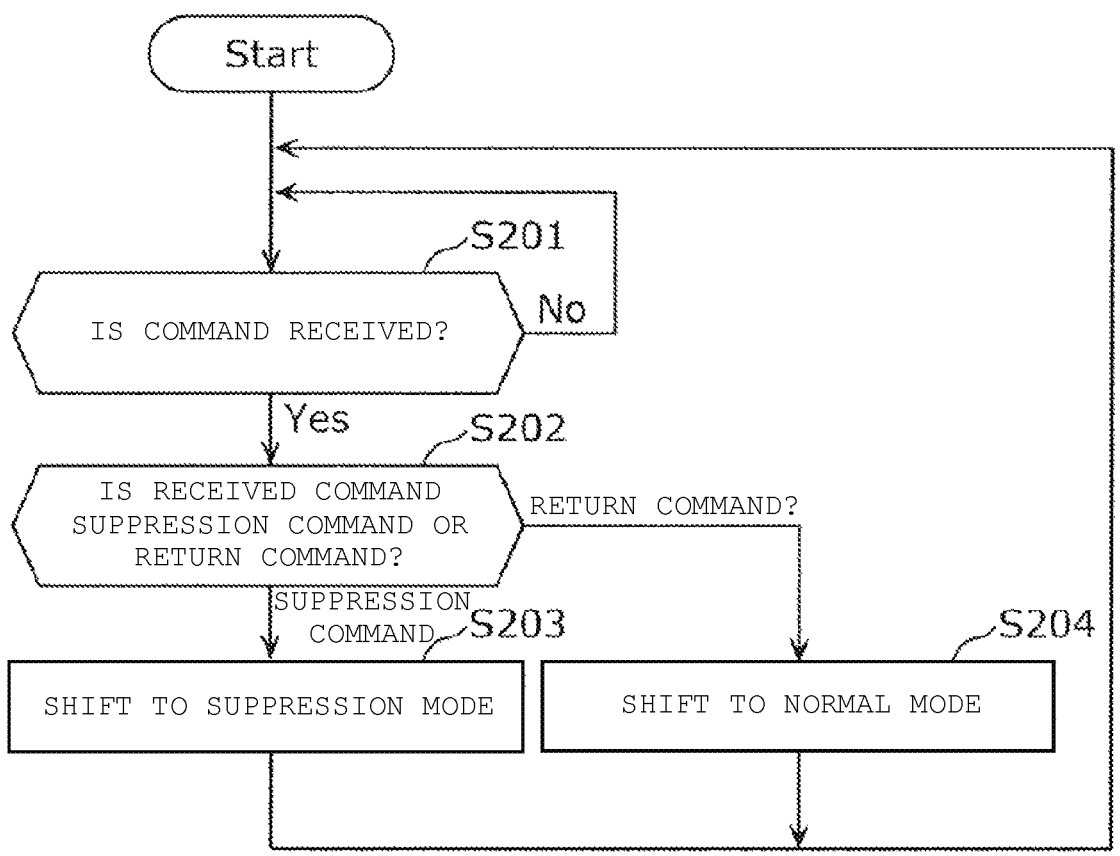
FIG. 9 is a flowchart illustrating processing for changing an operation mode of a control device according to a preferred embodiment of the present invention.

FIG. 9 is a flowchart illustrating the processing for changing the operation mode of the control device 10 according to the present preferred embodiment.

In step S201, the limiter 52 determines whether either of the suppression command and the return command has been received from the transmitter 68 of the conversion device 20. When either of the commands has been received, the processing proceeds to step S202. Otherwise, step S201 is executed again. That is, the limiter 52 waits in step S201 until receiving either of the commands from the transmitter 68.

In step S202, the limiter 52 determines whether the command received in step S201 is the suppression command or the return command. When the limiter 52 determines that the command received in step S201 is the suppression command, the processing proceeds to step S203. When the limiter 52 determines that the command thus received is the return command, the processing proceeds to step S204.

In step S203, the limiter 52 shifts the operation mode to the suppression mode.

In step S204, the limiter 52 shifts the operation mode to the normal mode.

Upon completion of the process in step S203 or S204, step S201 is executed again.

Through the above-described processing, the operation mode is shifted based on the suppression command and the return command received from the conversion device 20. Then, the control device 10 limits the data amount of the control data to be transmitted to the conversion device 20 based on estimated consumption of the buffer 65 of the conversion device 20, which makes it possible to transmit the control data with the buffer prevented from overflowing and becoming empty.

Figure 10:
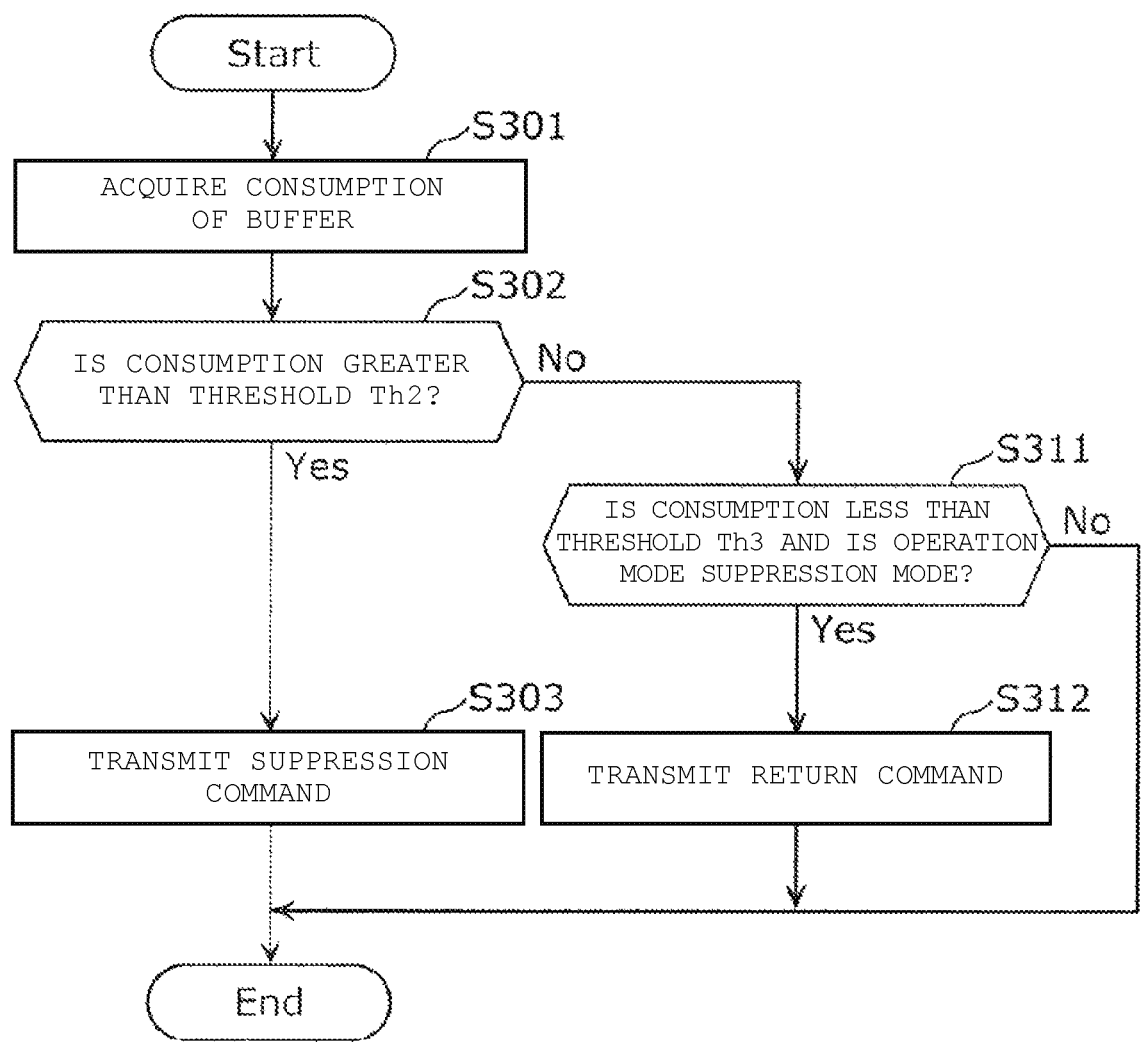
FIG. 10 is a flowchart illustrating processing of a conversion device according to a preferred embodiment of the present invention.

FIG. 10 is a flowchart illustrating processing of the conversion device 20 according to the present preferred embodiment.

In step S301, the acquirer 66 acquires the consumption of the buffer 65.

In step S302, the transmitter 68 determines whether the consumption of the buffer 65 acquired by the acquirer 66 in step S301 is greater than the threshold Th2. When the transmitter 68 determines that the consumption of the buffer 65 is greater than the threshold Th2, the processing proceeds to step S303. Otherwise, the processing proceeds to step S311.

In step S303, the transmitter 68 transmits the suppression command to the control device 10.

In step S311, the transmitter 68 determines whether the consumption is less than the threshold Th3 and whether the operation mode of the control device 10 is the suppression mode. When the consumption is less than the threshold Th3 and the operation mode of the control device 10 is the suppression mode, the processing proceeds to step S312. Otherwise, the series of processes illustrated in FIG. 10 comes to an end.

In step S312, the transmitter 68 transmits the return command to the control device 10.

Upon completion of the process in step S303 or S312, the series of processes illustrated in FIG. 10 comes to an end.

Note that, in determining whether the operation mode of the control device 10 is the suppression mode in step S311, the transmitter 68 may inquire about the operation mode of the control device 10 in advance and then acquire the operation mode or may make the determination based on whether the data amount of the control data received from the control device 10 is less than the predetermined threshold.

An operation example of the control system 1 configured as described above will be described below.

Figure 11:
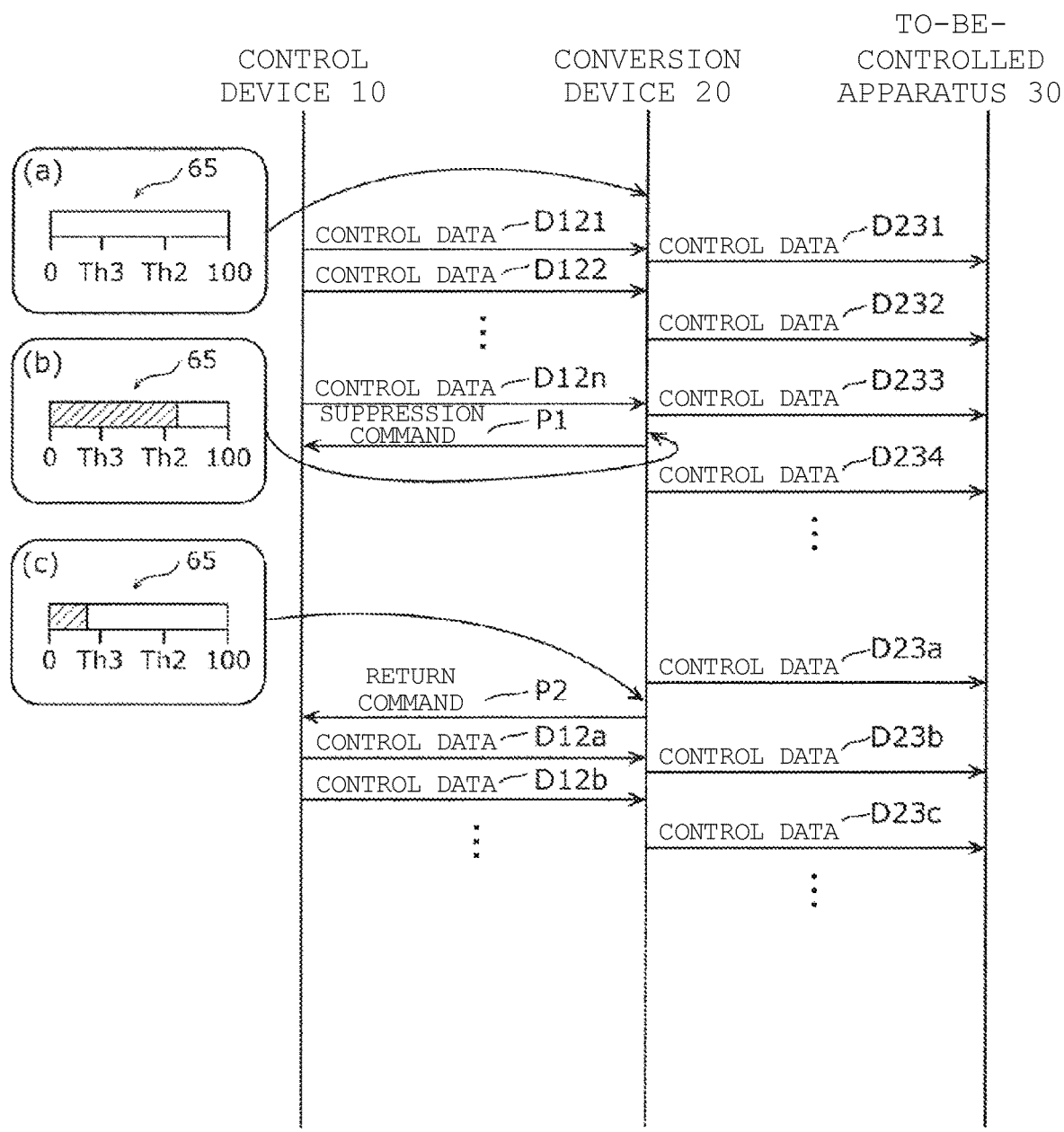
FIG. 11 is a sequence diagram illustrating an operation example of a control system according to a preferred embodiment of the present invention.

FIG. 11 is a sequence diagram illustrating the operation example of the control system 1 according to the present preferred embodiment. FIG. 11 illustrates a series of processes in which, after starting the transmission of the control data in the normal mode, the control device 10 receives the suppression command and then changes to the suppression mode to suppress the transmission of the control data. Thereafter, upon receiving the return command, the control device 10 changes to the normal mode to resume the transmission of the control data. Further, the consumption of the buffer 65 at three time points is illustrated as hatched areas in (a), (b) and (c) in FIG. 11. Note that, for the sake of simplification, the description of FIG. 11 will be based on the premise that the unique limitation of the control device 10 (limitation after step S102 in FIG. 8) is disabled.

In FIG. 11, it is assumed that the buffer 65 of the conversion device 20 is initially empty (refer to (a) in FIG. 11).

In this state, the control device 10 sequentially transmits, to the conversion device 20, pieces of control data D121, D122, and D12n (denoted as D121 or the like) to control the to-be-controlled apparatus 30.

Upon receiving the control data D121 or the like from the control device 10, the conversion device 20 converts the control data D121 or the like thus received into the serial communication format and transmits the data thus converted as control data D231, D232, D233, D234, or the like.

It is assumed that the consumption of the buffer 65 is greater than the threshold Th2 at the time when the conversion device 20 receives the control data D12n ((b) in FIG. 11).

Upon the consumption of the buffer 65 becoming larger than the threshold Th2, the conversion device 20 transmits a suppression command P1 to the control device 10. As a result, the limiter 52 shifts the operation mode to the suppression mode, and suppresses the transmission of the control data from the control device 10 to the conversion device 20. On the other hand, the control data held in the buffer 65 is uninterruptedly transmitted to the to-be-controlled apparatus 30, and the consumption of the buffer 65 gradually decreases. Then, after transmitting control data D23a, the consumption of the buffer 65 becomes less than the threshold Th3 ((c) in FIG. 11).

Upon the consumption of the buffer 65 becoming less than the threshold Th3, the conversion device 20 transmits a return command P2 to the control device 10. As a result, the limiter 52 shifts the operation mode to the normal mode, and resumes the transmission of the control data from the control device 10 to the conversion device 20, which causes pieces of control data D12a, D12b, and the like to be transmitted.

As described above, the control device 10 and the conversion device 20 transmit the control data to the to-be-controlled apparatus 30 while preventing the buffer 65 from overflowing and becoming empty.

Note that the data transmission method of the control device 10 described with reference to FIGS. 7 to 11 has an effect of, in a configuration where the control device 10 is disposed outside the clean room R and the conversion device 20 and the to-be-controlled apparatus 30 are disposed in the clean room R, preventing the buffer 65 of the conversion device 20 from overflowing or becoming empty while reducing the maintenance cost of the clean room. Note that this transmission method is also applicable to a control system unrelated to the clean room R. In such a case, the transmission method has an effect of preventing the buffer 65 of the conversion device 20 from overflowing or becoming empty.

As described above, according to the control system of the present preferred embodiment, the conversion device is disposed in the clean room, which eliminates the restriction that the computer defining and functioning as the control device needs to be disposed in the clean room and allows the control device to be disposed outside the clean room. When a space occupied by the conversion device is smaller than that of the control device, a space occupied by the devices of the control system and furniture on which the devices are disposed in the clean room is able to be reduced, which leads to savings in the space occupied by the devices in the clean room. As a result, a maintenance cost of the clean room is able to be reduced.

Further, the control device transmits control data to a plurality of the to-be-controlled apparatuses via a plurality of the conversion devices using one Ethernet interface. For the control system, the number of the control devices is able to be reduced as compared with a configuration where the number of the control devices equals the number of the to-be-controlled apparatuses. Further, a number of interfaces the control device includes is able to be reduced as compared with a configuration where the control device includes Ethernet interfaces or legacy device interfaces (for example, serial communication interfaces) equal in number to the number of the to-be-controlled apparatuses.

Further, the consumption of the buffer of the conversion device is estimated, and the transmission data rate of the control data to be transmitted by the control device is limited in accordance with the estimation. As a result, the control data is able to be delivered to the to-be-controlled apparatus with the buffer of the conversion device prevented from overflowing or becoming empty.

Further, when a probability that the buffer will overflow based on the consumption of the buffer of the conversion device increases, the transmission data rate of the control data to be transmitted by the control device is reduced even in response to a command from the conversion device, which makes it possible to further reduce the probability that the buffer will overflow based on respective determinations made by both the devices.

Further, when the probability that the buffer will become empty based on the consumption of the buffer of the conversion device increases, the transmission data rate of the control data to be transmitted by the control device is increased, which makes it possible to reduce the probability that the buffer will become empty.

Although the control systems of the present invention has been described based on the preferred embodiments, the present invention is not limited to the preferred embodiments. Unless deviating from the gist of the present invention, a preferred embodiment that results from applying various modifications conceivable by those skilled in the art to the present preferred embodiments as well as a preferred embodiment that results from combining elements in different preferred embodiments is also within the scope of the present invention.

Preferred embodiments of the present invention are also applicable to a control system that reduces the maintenance cost of a clean room. More specifically, preferred embodiments of the present invention are applicable to a control system or the like to control industrial equipment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A control system comprising:
   a plurality of to-be-controlled apparatuses disposed in a clean room;
   a control device disposed outside the clean room to control the plurality of to-be-controlled apparatuses through Ethernet communication;
   a plurality of conversion devices disposed in the clean room to mutually convert communication data on the Ethernet communication with the control device and communication data on serial communication with the plurality of to-be-controlled apparatuses; wherein
   the plurality of conversion devices perform serial communication with the plurality of to-be-controlled apparatuses on a one-to-one basis;
   the control device includes one Ethernet interface and a plurality of controllers that perform Ethernet communication with the plurality of conversion devices via the one Ethernet interface on a one-to-one basis;
   the plurality of conversion devices include:
      a buffer that temporarily holds control data received from the control device until the control data is transmitted to one of the plurality of to-be-controlled apparatuses;
      a processor that defines and functions as an acquirer that acquires a consumption of the buffer; and
      a processor that defines and functions as a transmitter that transmits first information indicating that the consumption acquired by the acquirer is greater than a first threshold to the control device; and
   the control device includes:
      a processor that defines and functions as a generator that generates the control data to control the one of the plurality of to-be-controlled apparatuses and transmits the generated control data; and
      a processor that defines and functions as a first limiter that sets a maximum transmission rate of the control data to a value greater than a transmission speed of serial communication between one of the plurality of conversion devices and the one of the plurality of to-be-controlled apparatuses, and that changes the maximum transmission rate to zero upon receiving the first information from the transmitter.

2. The control system according to claim 1, wherein the control device includes
   a processor that defines and functions as an estimator that estimates the consumption of the buffer; and
   the first limiter that determines the maximum transmission rate of the control data based on the consumption estimated by the estimator, and limits a transmission data rate of the control data to be transmitted by the generator to a rate equal to or less than the determined maximum transmission rate.

3. The control system according to claim 2, wherein the processor that defines and functions as the first limiter also defines and functions as a second limiter that sets the maximum transmission rate of the control data to a value greater than the transmission speed of serial communication between the one of the plurality of conversion devices and the one of the plurality of to-be-controlled apparatuses, and that changes the maximum transmission rate to zero upon receiving the first information from the transmitter.

4. The control system according to claim 3, wherein the transmitter transmits, to the control device, second information indicating that the consumption acquired by the acquirer is less than a second threshold after transmitting the first information; and
   the second limiter changes the maximum transmission rate to a value greater than the transmission speed of serial communication between the one of the plurality of conversion devices and the one of the plurality of to-be-controlled apparatuses upon receiving the second information from the transmitter with the maximum transmission rate set to zero.

5. The control system according to claim 1, wherein the transmitter transmits, to the control device, second information indicating that the consumption acquired by the acquirer is less than a second threshold after transmitting the first information; and
   the first limiter changes the maximum transmission rate to a value greater than the transmission speed of serial communication between the one of the plurality of conversion devices and the one of the plurality of to-be-controlled apparatuses upon receiving the second information from the transmitter with the maximum transmission rate set to zero.

6. A method to control a control system that causes a control device included in a transfer system to control a plurality of conversion devices and a plurality of to-be-controlled apparatuses, the plurality of conversion devices being controlled via Ethernet communication with the control device, the plurality of to-be-controlled apparatuses being controlled via serial communication with the plurality of conversion devices, the method comprising:

causing the control device disposed outside a clean room to control the plurality of to-be-controlled apparatuses disposed in the clean room via the Ethernet communication; and causing the plurality of conversion devices disposed in the clean room to mutually convert communication data on the Ethernet communication with the control device and communication data on the serial communication with the plurality of to-be-controlled apparatuses; wherein the plurality of conversion devices perform serial communication with the plurality of to-be-controlled apparatuses on a one-to-one basis;

the control device includes one Ethernet interface and a plurality of controllers that perform Ethernet communication with the plurality of conversion devices via the one Ethernet interface on a one-to-one basis;

the plurality of conversion devices include:

a buffer that temporarily holds control data received from the control device until the control data is transmitted to one of the plurality of to-be-controlled apparatuses;

a processor that defines and functions as an acquirer that acquires a consumption of the buffer; and a processor that defines and functions as a transmitter that transmits first information indicating that the consumption acquired by the acquirer is greater than a first threshold to the control device; and the control device includes:

a processor that defines and functions as a generator that generates the control data to control the one of the plurality of to-be-controlled apparatuses and transmits the generated control data; and a processor that defines and functions as a first limiter that sets a maximum transmission rate of the control data to a value greater than a transmission speed of serial communication between one of the plurality of conversion devices and the one of the plurality of to-be-controlled apparatuses, and that changes the maximum transmission rate to zero upon receiving the first information from the transmitter.

7. The method according to claim 6, wherein the method further comprises causing the control device to:

estimate the consumption of the buffer; and determine the maximum transmission rate of the control data based on the estimated consumption estimated and regulate a transmission data rate of the control data to be transmitted to the determined maximum transmission rate.

* * * * *